US011247157B2

(12) United States Patent
Perl-Olshvang et al.

(10) Patent No.: US 11,247,157 B2
(45) Date of Patent: Feb. 15, 2022

(54) FLOW AND PRESSURE CONTROL IN CYCLONIC FILTER ARRAYS

(71) Applicant: enVerid Systems, Inc., Westwood, MA (US)

(72) Inventors: Sharon Perl-Olshvang, Pardes Hanna-Karkur (IL); Udi Meirav, Newton, MA (US)

(73) Assignee: ENVERID SYSTEMS, INC., Westwood, MA (US)

( * ) Notice: Subject to any disclaimer, the term of this patent is extended or adjusted under 35 U.S.C. 154(b) by 0 days.

(21) Appl. No.: 16/632,285

(22) PCT Filed: Jul. 20, 2018

(86) PCT No.: PCT/US2018/043123
§ 371 (c)(1),
(2) Date: Jan. 17, 2020

(87) PCT Pub. No.: WO2019/018788
PCT Pub. Date: Jan. 24, 2019

(65) Prior Publication Data
US 2020/0360847 A1    Nov. 19, 2020

Related U.S. Application Data

(60) Provisional application No. 62/534,706, filed on Jul. 20, 2017.

(51) Int. Cl.
*B01D 45/12* (2006.01)
*B01D 45/16* (2006.01)
(Continued)

(52) U.S. Cl.
CPC ............... *B01D 45/16* (2013.01); *B04C 3/04* (2013.01); *B04C 3/06* (2013.01); *B04C 5/15* (2013.01);
(Continued)

(58) Field of Classification Search
CPC .. B01D 45/16; B04C 3/04; B04C 3/06; B04C 2009/002; B04C 2009/005; B04C 5/28; B04C 5/15; B04C 11/00
See application file for complete search history.

(56) References Cited

U.S. PATENT DOCUMENTS 2,268,170 A    12/1941   Schmidt
2,281,610 A    5/1942    Watson et al.
(Continued)

FOREIGN PATENT DOCUMENTS

CN    1788855 A    6/2006
CN    1795804 A    7/2006
(Continued)

OTHER PUBLICATIONS

International Search Report and Written Opinion for PCT/US2018/043123, dated Oct. 30, 2018, 11 pages.
(Continued)

*Primary Examiner* — Dung H Bui
(74) *Attorney, Agent, or Firm* — Cooley LLP

(57) ABSTRACT

An air filtration system comprising a plurality of sections configured to receive an incoming airstream is disclosed. In some embodiments, each section of the plurality of sections includes a first airstream receiving side (ASRS) and a second air stream exhaust side (ASES), and a plurality of cells each comprising a cyclonic cavity having a tangential inlet arranged to receive a portion of the airstream via the ASRS, and an axial outlet arranged to exhaust the portion of the airstream to the ASES. Each section is further configured with a cover that can be opened and closed, such that the closing of one or more respective covers of respective sections forces the airstream to flow through remaining
(Continued)

sections having open covers as well as their respective cells, at a velocity greater than when such one or more respective covers are open.

15 Claims, 10 Drawing Sheets

(51) Int. Cl.
*B04C 3/04* (2006.01)
*B04C 3/06* (2006.01)
*B04C 9/00* (2006.01)
*B04C 11/00* (2006.01)
*B04C 5/15* (2006.01)

(52) U.S. Cl.
CPC ......... *B04C 11/00* (2013.01); *B04C 2009/002* (2013.01); *B04C 2009/005* (2013.01)

(56) References Cited

U.S. PATENT DOCUMENTS

| | | | |
|---|---|---|---|
| 2,734,630 A | 2/1956 | Van Der Wal | |
| 2,854,092 A | 9/1958 | Gustavsson | |
| 2,874,801 A | 2/1959 | Van Der Kolk | |
| 3,074,219 A | 1/1963 | Phyl et al. | |
| 3,261,467 A | 7/1966 | Wikdahl | |
| 3,350,852 A | 11/1967 | Schindling | |
| 3,747,306 A | 7/1973 | Wikdahl | |
| 3,915,679 A | 10/1975 | Roach et al. | |
| 3,959,123 A | 5/1976 | Wikdahl | |
| 4,123,364 A | 10/1978 | Mozley | |
| 4,242,115 A * | 12/1980 | Harold ................. | B01D 45/16 55/347 |
| 4,430,100 A | 2/1984 | Cardo | |
| 4,460,391 A | 7/1984 | Muller et al. | |
| 4,539,105 A | 9/1985 | Metcalf | |
| 4,687,497 A | 8/1987 | Owen et al. | |
| 4,702,846 A | 10/1987 | Ryynänen | |
| 5,403,367 A | 4/1995 | De Villiers et al. | |
| 5,947,300 A * | 9/1999 | Lange .................. | B04C 5/13 209/726 |
| 5,980,639 A | 11/1999 | Trickey et al. | |
| 6,129,217 A * | 10/2000 | Trickey ................. | B04C 5/08 209/727 |
| 6,270,544 B1 | 8/2001 | Mencher et al. | |
| 7,931,718 B2 * | 4/2011 | Cheng .................. | B01D 45/16 55/346 |
| 2003/0057151 A1 | 3/2003 | Kopec et al. | |
| 2006/0130445 A1 | 6/2006 | Park et al. | |
| 2006/0130449 A1 | 6/2006 | Han et al. | |
| 2006/0168923 A1 | 8/2006 | Lee et al. | |
| 2006/0230717 A1 | 10/2006 | Oh et al. | |
| 2006/0230719 A1 | 10/2006 | Han et al. | |
| 2007/0151453 A1 | 7/2007 | Fukuma | |
| 2007/0234691 A1 | 10/2007 | Han et al. | |
| 2008/0028940 A1 | 2/2008 | Han et al. | |
| 2008/0148694 A1 | 6/2008 | Smith | |
| 2009/0031680 A1 | 2/2009 | Hyun et al. | |
| 2009/0036288 A1 | 2/2009 | Hu et al. | |
| 2010/0224073 A1 | 9/2010 | Oh et al. | |
| 2010/0258008 A1 | 10/2010 | Cheng | |
| 2010/0267540 A1 | 10/2010 | Babb et al. | |
| 2012/0036675 A1 | 2/2012 | Conrad | |
| 2012/0132075 A1 | 5/2012 | Jarrier et al. | |
| 2012/0209550 A1 | 8/2012 | Van Der Spek et al. | |
| 2013/0220123 A1 | 8/2013 | England et al. | |
| 2014/0305311 A1 | 10/2014 | Nakamura | |
| 2014/0373490 A1 | 12/2014 | Wuebbeling et al. | |
| 2016/0332171 A1 | 11/2016 | Moons et al. | |
| 2018/0207573 A1 | 7/2018 | Perl-Olshavang et al. | |
| 2018/0207651 A1 | 7/2018 | Meirav et al. | |
| 2019/0091701 A1 * | 3/2019 | Hyun ................... | A47L 9/1641 |
| 2019/0111375 A1 * | 4/2019 | Chen .................... | B01D 46/30 |
| 2019/0381437 A1 | 12/2019 | Perl-Olshavang et al. | |

FOREIGN PATENT DOCUMENTS

| | | |
|---|---|---|
| CN | 101121155 A | 2/2008 |
| CN | 103889584 A | 6/2014 |
| EP | 1063017 A2 | 12/2000 |
| EP | 1063017 A3 | 12/2000 |
| EP | 1671571 A1 | 6/2006 |
| GB | 999938 A | 7/1965 |
| KR | 2012/0048850 A | 5/2012 |
| WO | WO 2010/121991 A1 | 10/2010 |
| WO | WO 2015/112010 A1 | 7/2015 |
| WO | WO 2017/019628 A1 | 2/2017 |
| WO | WO 2018/136968 A1 | 7/2018 |
| WO | WO 2019/018788 A1 | 1/2019 |
| WO | WO 2020/047437 A1 | 3/2020 |

OTHER PUBLICATIONS

International Preliminary Report on Patentability for PCT/US2018/043123, dated Jan. 21, 2020, 9 pages.

Chinese Office Action dated May 20, 2021, in Chinese Patent Application No. 201880047638.7, with English translation, 16 pages total.

* cited by examiner

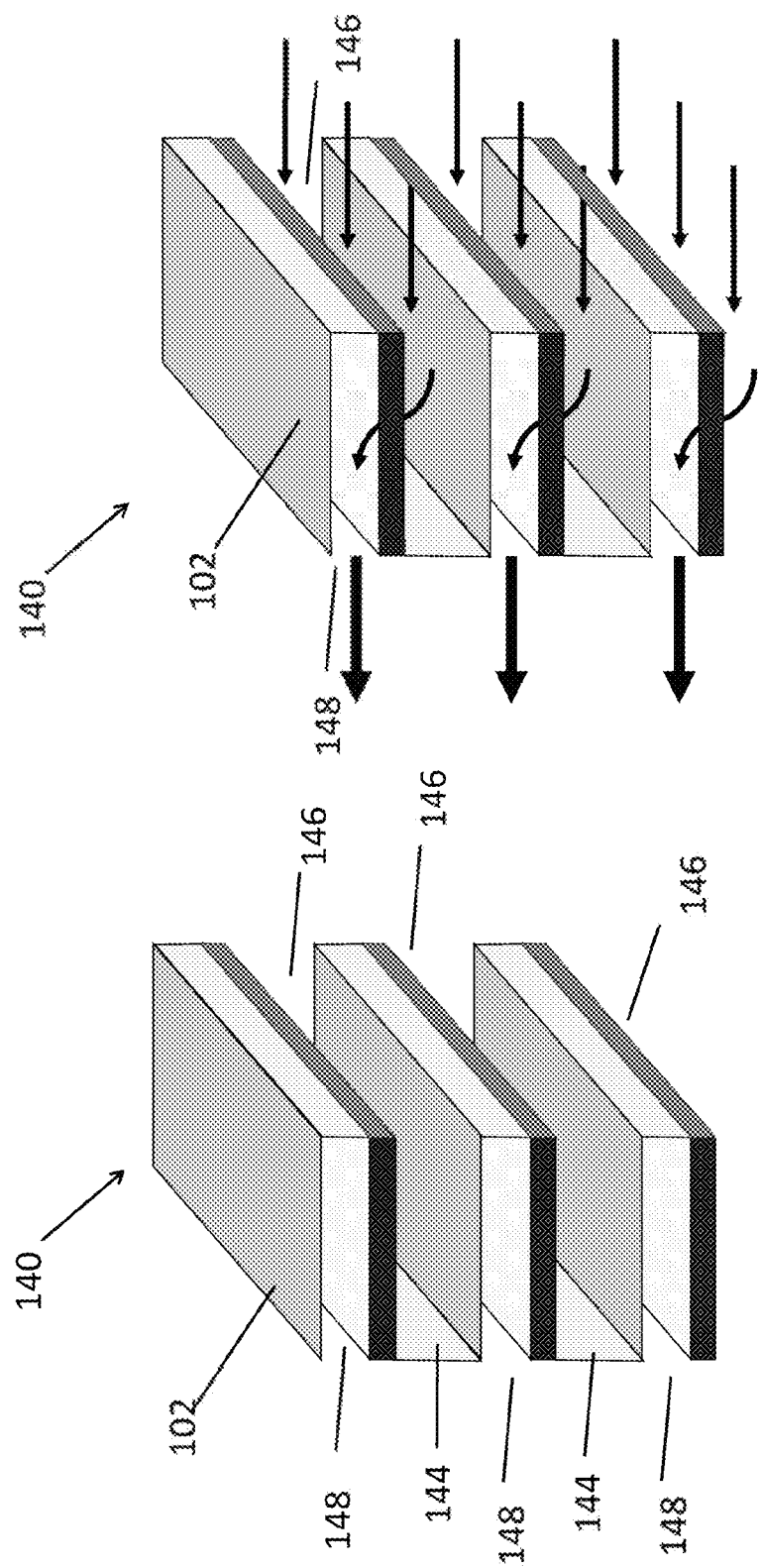

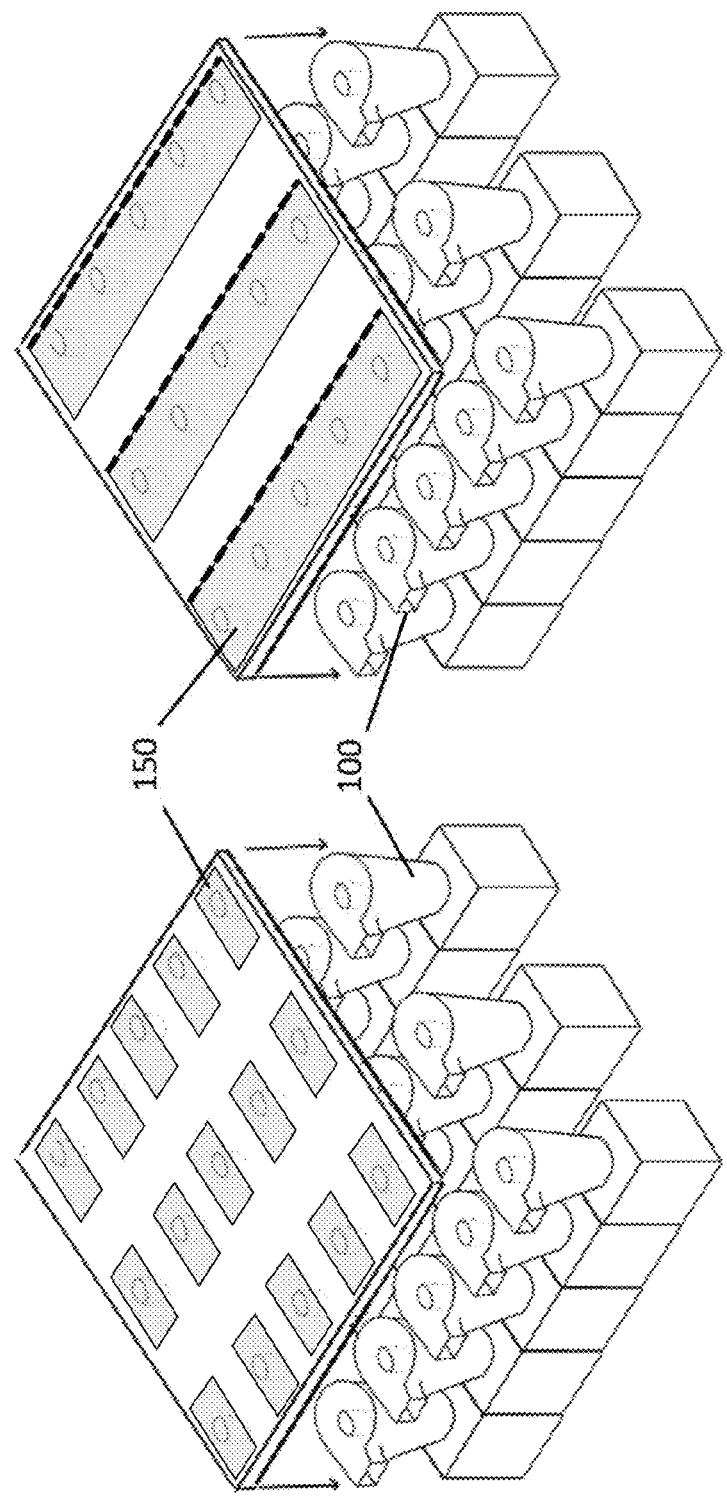

FLOW AND PRESSURE CONTROL IN CYCLONIC FILTER ARRAYS

CROSS REFERENCE TO RELATED APPLICATION

This application is a 35 U.S.C. § 371 national stage entry of PCT International Application No.: PCT/US2018/043123, filed Jul. 20, 2018, entitled "Flow and Pressure Control in Cyclonic Filter Arrays", which claims priority to U.S. Provisional Patent Application No. 62/534,706 filed Jul. 20, 2017, entitled "Flow and Pressure Control in Cyclonic Filter Arrays". Each of the preceding disclosures are incorporated herein by reference in its entirety.

TECHNICAL FIELD

Embodiments of the present disclosure generally relate to apparatus, systems and methods for air filtration.

BACKGROUND

Cyclonic array filters represent a method of filtering an air stream and separating suspended particles from the air. These filters comprise one or more arrays of connected, parallel cells, where each cell is essentially a miniature, hollow cyclonic cavity with a tangential inlet and an axial outlet. The array can form a monolithic sheet, or multiple such sheets, and the cells are hermetically attached to their neighbors such that air can only cross the sheet by entering one of the cyclonic cells through its inlet and emerging through its outlet. Upon entering the cavity at a sufficiently high velocity, the air circulates to form a cyclone or a vortex in the cell. The airborne particles experience a centrifugal force that pushes them towards the inner wall of the cavity and are collected at the bottom of the cyclone. Thousands of miniature cyclones can be efficiently produced in a single monolithic array and such arrays can be used to form a filter of any size needed, and to filter large volumes of air flow.

These cyclonic array filters are passive, meaning that the flow of air is induced externally, e.g. by one or more fans that are positioned before or after the array. However, the rate of air flow in a cyclonic array filter may be important for its ultimate performance. The separation capability of the cyclonic cells is dependent on the velocity of the air flow in the cyclone, as this velocity induces the centrifugal forces that separate the suspended airborne particles. A passive array has many practical advantages, as it is easily manufacturable and can replace a conventional media filter with similar dimensions. However, the rate of air flow through the entire array may be such that the velocities in each cyclone are high enough to achieve the desired separation and filtration performance. If a passive array is deployed in systems with flow rates that are variable or otherwise too low, performance may be compromised.

SUMMARY OF THE DISCLOSURE

A passive cyclonic array filter is described where the array comprises several independent sections and where some of the sections can be dynamically sealed or disabled in response to lower air flow. By sealing off parts of the array, the remaining parts carry a higher velocity, which allows the cyclones to maintain their required filtration performance despite the reduced overall air flow.

Some embodiments of the current disclosure disclose an air filtration system comprising a plurality of sections configured to receive an incoming airstream, wherein: each section comprises a first airstream receiving side (ASRS) and a second air stream exhaust side (ASES), and a plurality of cells each comprising a cyclonic cavity having a tangential inlet arranged to receive a portion of the airstream via the ASRS, and an axial outlet arranged to exhaust the portion of the airstream to the ASES; each section is configured such that air can only cross from the ASRS to the ASES via the plurality of cells via the respective tangential inlets and axial outlets; and each section is further configured with a cover that can be opened and closed, such that the closing of one or more respective covers of respective sections forces the airstream to flow through remaining sections having open covers as well as their respective cells, at a velocity greater than when such one or more respective covers are open.

Some embodiments of the current disclosure disclose a airborne particle removal method for removing airborne particles from an airstream, comprising: providing the system disclosed above; directing an airstream into the system; opening and/or closing one or more of the covers for one or more respective sections so as to allow a subset of the plurality of sections to carry the airflow of the airstream while one or more sections are covered, wherein: the closing of one or more respective covers of respective sections forces the airstream to flow through remaining sections having open covers as well as their respective cells, at a velocity greater than when such one or more respective covers are open.

Such embodiments (systems, methods, etc.) may include one and/or another (and also, a plurality of) of the following features, structures, functionalities, steps, and/or clarifications, yielding yet still other embodiments of the present disclosure:

- where a single common air stream through the system is induced by a plurality fans or blowers that provide a single air stream to the sections of the system;
- where each cover is configured to open or close in response to surpassing at least one of a predetermined threshold of a volume, velocity, and pressure of the incoming airstream;
- where each cover is configured to open or close in response to falling below at least one of a predetermined threshold of a volume, velocity, and pressure of the incoming airstream;
- where the threshold for the opening or closing of at least one first cover for a first section is different than the threshold for the opening or closing for a second section;
- where the cover comprises at least one of a sealing sheet or membrane, a lid, and a flap;
- where each cover is configured to cover one or more axial outlets of the plurality of cells;
- where one or more sections comprise a single cell;
- where the cover is selected from the group consisting of plastic, polymer, rubber, metal, paper, glass, or a combination of any two or more of the foregoing;
- where one or more of the covers for one or more of the respective sections close in the absence of at least one of a sufficient volume, velocity, and pressure of the incoming airstream;
- where one or more of the covers are configured to close due to weight and/or elastic force;
- one or more motors and/or actuators configured to open and/or close the one or more covers;
- where the motors and/or actuators are configured for activation by an electrical signal from a control system that directly or indirectly controls, detects, measures or received information about, airflow incident on the one or more covers configured to open and/or close via the one or motors and/or actuators;

where at least one section does not include a cover;

one or more fans configured to generate the airstream; and where at least one of the volume, velocity, and pressure of the airstream determines the opened or closed state of at least one cover of a respective section.

Some embodiments of the current disclosure disclose an air filtration system, comprising: a plurality of sections configured to receive an incoming airstream, one or more sections of the plurality of sections configured with one or more respective covers, the one or more respective covers including at least one of a sealing sheet or membrane, a lid, and a flap and are selected from the group consisting of plastic, polymer, rubber, metal, paper, glass, or a combination of any two or more of the foregoing; a plurality fans or blowers providing a single air stream to the plurality of sections of the system; one or more motors and/or actuators configured to open and/or close the one or more respective covers, the one or more motors and/or actuators configured for activation by an electrical signal from a control system that directly or indirectly controls, detects, measures or received information about, airflow incident on the one or more respective covers.

In such embodiments, each section comprises a first airstream receiving side (ASRS) and a second air stream exhaust side (ASES), and a plurality of cells each comprising a cyclonic cavity having a tangential inlet arranged to receive a portion of the airstream via the ASRS, and an axial outlet arranged to exhaust the portion of the airstream to the ASES; each section is configured such that air can only cross from the ASRS to the ASES via the plurality of cells via the respective tangential inlets and axial outlets; the closing of the one or more respective covers of respective sections forces the airstream to flow through remaining sections having open covers and through their respective cells, at a velocity greater than when such one or more respective covers are open; and the one or more respective covers configured to open or close in response to surpassing or falling below at least one of a predetermined threshold of a volume, velocity, and pressure of the incoming airstream, the threshold for the opening or closing of at least one first cover for a first section is different than the threshold for the opening or closing for a second section.

Some embodiments of the current disclosure disclose an air filtration system comprising a plurality of sections configured to receive an incoming airstream, wherein: each section of the plurality of sections comprises a first airstream receiving side (ASRS) and a second air stream exhaust side (ASES); a first section of the plurality of sections includes a first single cell; a second section of the plurality of sections includes a plurality of cells, the first single cell and the plurality of cells each comprising a cyclonic cavity having a tangential inlet arranged to receive a portion of the airstream via the ASRS, and an axial outlet arranged to exhaust the portion of the airstream to the ASES; the first section is configured such that air can only cross from the ASRS to the ASES via the first single cell via the respective tangential inlets and axial outlets; the second section is configured such that air can only cross from the ASRS to the ASES via the plurality of cells via the respective tangential inlets and axial outlets; one or more sections of the plurality of sections is configured with a cover that can be opened and closed, such that the closing of one or more respective covers of respective one or more sections forces the airstream to flow through remaining sections having open covers, at a velocity greater than when such one or more respective covers are open; and at least one section of the plurality of sections does not include a cover.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

FIGS. 4A-C are schematic illustrations of a 3-section cyclonic array, with the three sections stacked in parallel (4A), showing the airflow pattern through the three sections (4B), and a larger cyclonic array with 36 sections, based on the same design concept (4C), constructed and operative according to some embodiments of the present disclosure;

FIGS. 7A-B are schematic illustrations of outlet seals that are placed in proximity to the axial outlets of the individual cells, showing an individual seal on the outlet of each cell (7A) and outlet seals shared by five adjacent cells (7B), constructed and operative according to some embodiments of the present disclosure.

DETAILED DESCRIPTION

Figure 1:
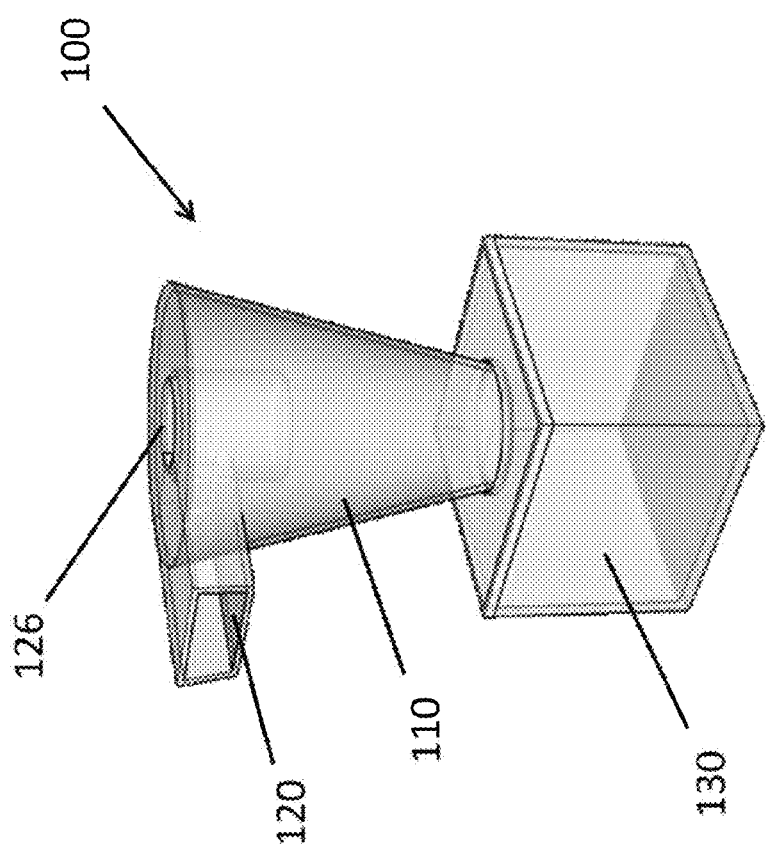
FIG. 1 is a schematic illustration of a cyclonic cell, constructed and operative according to some embodiments of the present disclosure.

A cyclonic array filter typically comprises one or more arrays of small, parallel cyclonic cells attached to each other to form the sheet. FIG. 1 schematically depicts an embodiment of such an individual cell 100, FIGS. 2A-C depict cyclonic array sections 102 of multiple cells 100 attached monolithically to a common sheet 104, and FIG. 3 illustrates the intended air flow pattern through the cyclonic array section 102 when it is used as a filter.

Referring to FIG. 1, the cell 100 comprises a cylindrically symmetric cavity 110 formed with a tangential inlet 120 that is in fluid communication with incoming air at a bottom side of the sheet 104 (2B), and an axial outlet 126 open to the opposite or top side of the sheet 104. An incoming air stream arrives at one side of the sheet 104 and its only passage to the other side of the sheet 104 is entering through the inlets 120, circulating in the cavities 110 and through the outlets 126 to the other side. While circulating though the cavities 110, the centrifugal forces separate suspended particles from the air stream, forcing them towards the cavity wall and eventually to a particle collection receptacle 130 that is typically located at the bottom of the cavity 110.

Figure 2A:
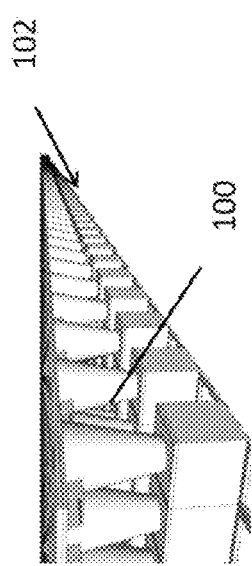
FIGS. 2A-C are schematic illustrations of a cyclonic array section, shown at a close-up view (2A), a view of an entire section (2B) and partially drawn with a graphic texture replacing the structural detail (2C), constructed and operative according to some embodiments of the present disclosure.
Figure 2B:
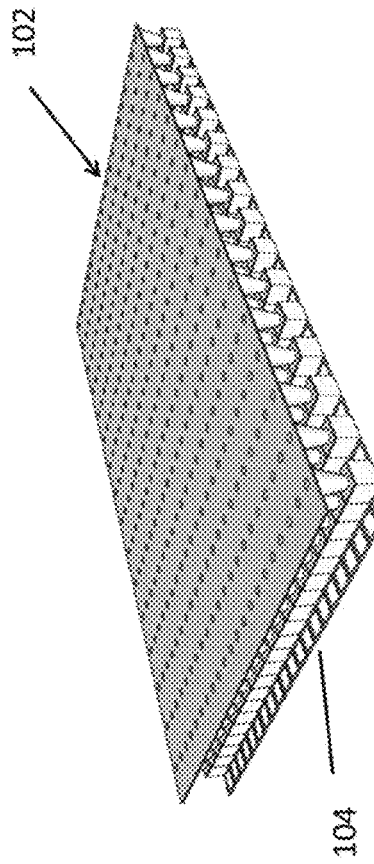
Figure 2C:
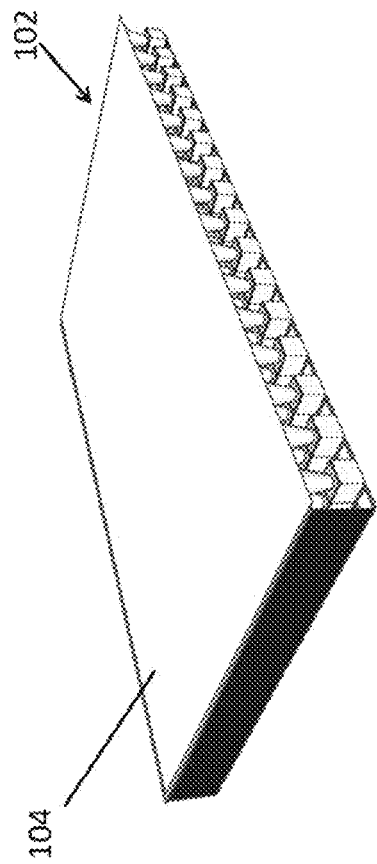

FIGS. 2A-C are schematic illustrations of a cyclonic array section 102. FIG. 2A shows a close up view of the cyclonic array section 102. FIG. 2B shows an entire section 102 and FIG. 2C shows the section 102 partially drawn with a graphic texture replacing the structural detail, as will be shown in FIGS. 3-6C.

Figure 3:
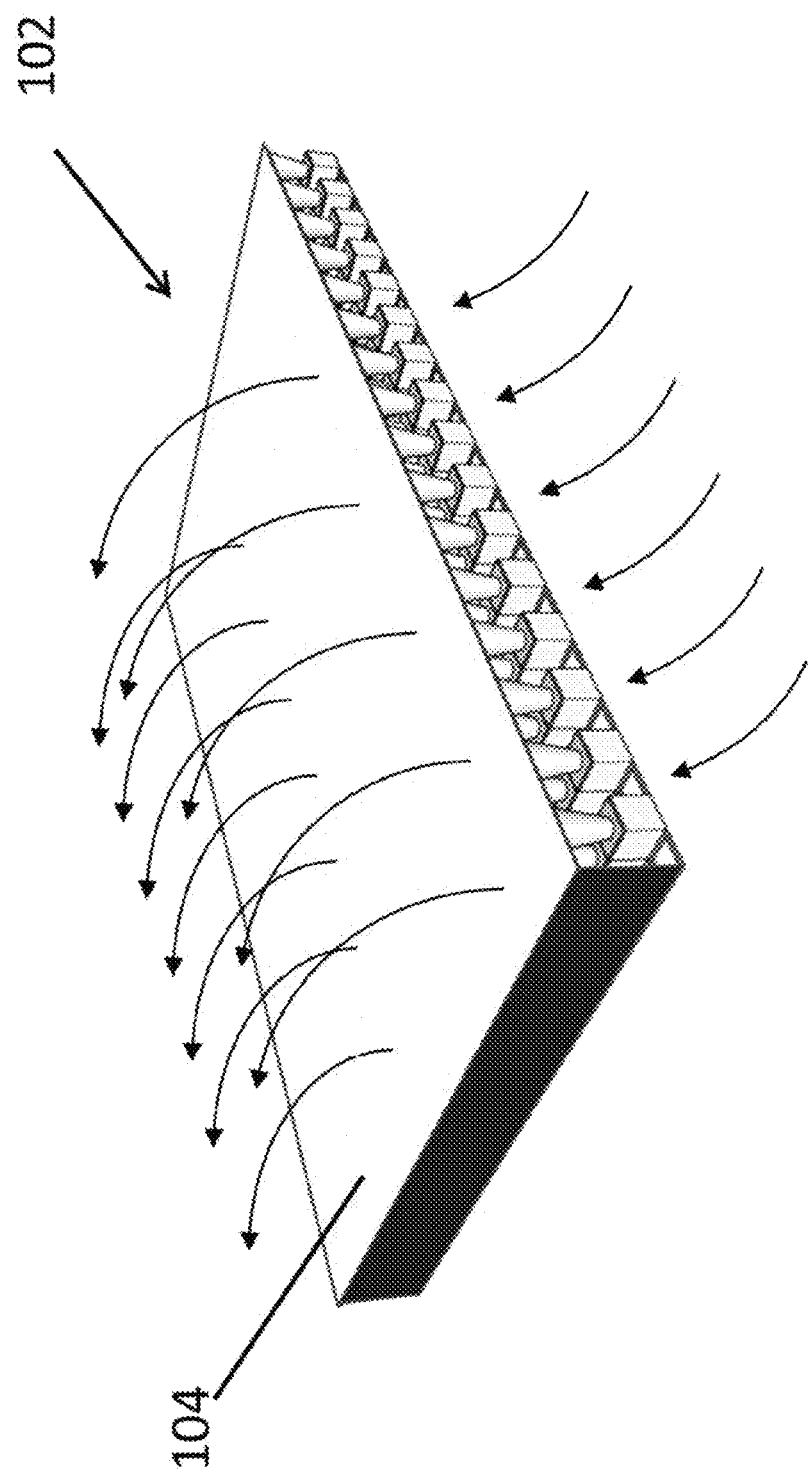
FIG. 3 is a schematic illustration of an air flow pattern through the cyclonic array section, with the air entering under and between the cyclonic cells, and emerging through outlets on the top, constructed and operative according to some embodiments of the present disclosure.

FIG. 3 is a schematic illustration of an air flow pattern through the cyclonic array section 102, with the air entering under and between the cyclonic cells 100, and emerging through outlets 126 on top.

In some embodiments, each cell 100 can only carry a limited amount of air flow due to its small size. Multiple arrays or array sections 102 can be combined to increase the number of cells 100 and therefore the total output.

Figure 4C:
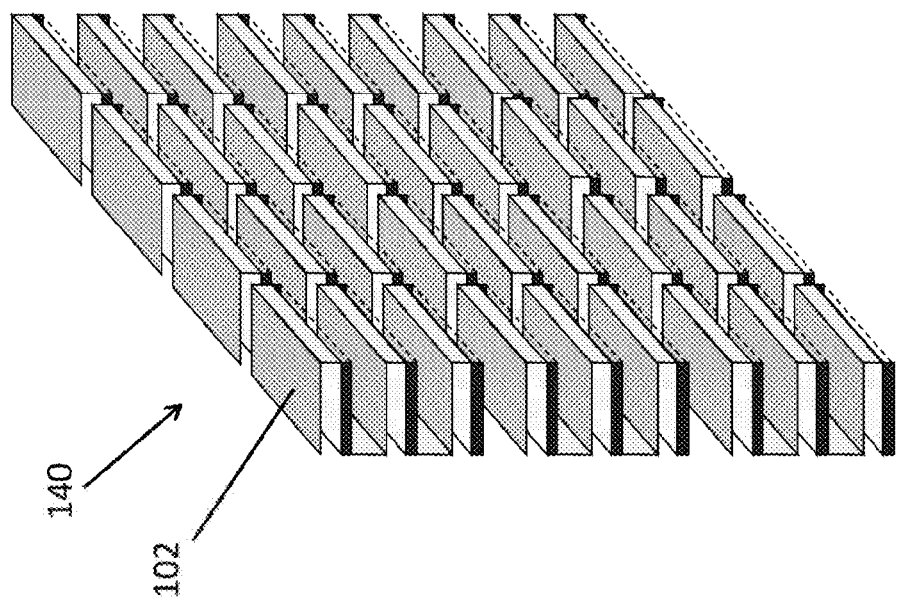

FIGS. 4A-C depict an assembly 140 comprising a 3-section array, with the three sections 102 of similar size, in horizontal orientation and stacked vertically in parallel. The assembly 140 is further configured with impermeable barriers 144 between the sections to ensure that the air flows through the cyclone cells 100 from inlets 146, such as from the sides of the two upper sections or from underneath the bottom section, through sections 102 to the outlets 148. FIG. 4B shows the air flow pattern through the three sections 102. The assembly 140 in this embodiment is designed for horizontal air flow entering the assembly 140 from the right-hand side, with the air going into all three sections 102 and constrained to flow from the bottom to the top of each section 102, while passing through the cells 100 (FIG. 1) of the arrays via the intended inlets 146 and outlets 148 and forming a cyclonic vortex in each one of the cells 100. This configuration has several advantages including that the particle collection receptacles 130 are located underneath their respective cavities 110 and thus gravity facilitates their collection process.

The number of sections 102 in such a configuration can be as large as needed. FIG. 4C shows a larger assembly 140 comprising 36 sections, based on the same design concept. In some embodiments, assemblies may comprise tens and even hundreds of sections or more.

The efficacy of particle separation or capture is dependent on the velocity of the circulating air flow inside the cavity 110, which in turn depends on the total airflow, or the pressure differential, between the incoming side of the array 102 and the outgoing side. In general, the higher the air flow and the velocity, the cyclonic cells 100 are more effective at separating airborne particles from the air flow. In general, the smaller particles are more difficult to separate from the air and the efficiency for fine particle capture is influenced by the flow velocities.

Many air flow systems are inherently designed to sustain variable air flow rates that can change at different times and under different conditions. In some embodiments, a single common air stream through the air filtration system is induced by a plurality fans or blowers that provide a single air stream to the sections 102 of the system. The induced air flow can vary from time to time or from place to place. There are several ways to modify flow rates, for example, by using variable speed fans, or using adjustable dampers that restrict the flow. But variable flow rates introduce a challenge for in-line, passive cyclonic array filters, since the change in flow rate affects the filtration efficiency. However, reducing air flow can reduce the efficiency of the filter, which would generally be an undesirable side effect. This problem does not typically occur in conventional media filters where reduced flow rates do not degrade filtration efficiency.

According to some embodiments, a solution for this problem may be implemented as follows. The cyclonic array is partitioned into a plurality of sections 102 where each section has a common inlet seal or outlet seal 150 (5A) that can be open or closed, by means that will be explained. Closing some of the sections 102 causes the air stream to be concentrated into the remaining open sections 102. By concentrating a smaller airflow rate into a smaller number of cells 100, the velocity in these cyclones cells 100 can be kept high even under reduced total flow, thus maintaining the required velocity and filtration performance.

At full air flow rate, all sections 102 are open and the flow is distributed in a proportional manner between the different sections 102, and all the cyclonic cells 100 participate in carrying the air stream and experience comparable inlet air speeds, and therefore comparable particle separation/capture efficiencies.

When air flow rate is lower than the full rate, for example due to changing the speed of the primary fan or if a high-throughput filter is installed in an air filtration system that is designed for less total flow, one or more of the sections 102 of the cyclonic array are sealed. The result is that a smaller amount of air now flows through a smaller number of cyclone cells 100, and the velocity in each of these cyclone cells 100 is kept high enough to maintain the required filtration efficiency.

As a non-limiting example, a 24"×24" inch square array of cyclone cell is utilized as a passive filter in a variable speed ventilation system. The array is partitioned into 16 smaller squares, each 6"×6" inches and containing approximately 2,000 parallel passive cyclone cells. The total number of cyclone cells is 16×2,000=32,000. The cyclone cells are designed to provide 95% efficiency for capturing particles larger than 1 micron, when the inlet flow velocity corresponds to a volumetric flow rate of 0.5 liters per minute (LPM) in an individual cyclone cell. Under these conditions, with all cyclone cells open in parallel, the total flow is 16,000 LPM, or 565 cubic feet per minute (CFM). If the fan provides the required thrust to force 16,000 LPM through the array, the filtration will be 95% efficient. But if the ventilation requirements are reduced by 25% and the fan is only delivering 12,000 LPM, the velocity in each cyclone cell inlet would decline commensurately to 0.375 LPM, resulting in lower filtration efficiency. But by blocking off 4 of the 16 sections, the result would be that only 24,000 cyclone cells are carrying the air stream, each carrying 0.5 LPM and delivering the same filtration efficiency as before.

The elimination of some of the sections from participating in the air flow can be achieved through various means. In some embodiments, the sections are actively controlled with the help of an electronic controller. Electromechanically modulated inlets or outlets are configured with dampers or shutters that can be opened or closed, controlled with an electrical signal. The signal can be generated by a control system that also controls the fans or the dampers that influence the variable air flow through the filter. Alternatively, the signal can be generated by a system that detects (and may not control or may control) the air flow rate through the filter. The air flow rate can be measured though any suitable means. Air flow sensors and meters may be provided utilizing various physical principles to determine velocity or volumetric air flow.

In certain embodiments, it is desirable to have a passive mechanism to eliminate sections of the filter, namely without requiring sensors, signals, electrical power and motorized components to achieve the objective of maintaining filtration efficiency. This can be implemented by configuring some or each sections with a pressure-sensitive or flow-sensitive seal or cover (e.g., damper). This seal is designed to be closed to air flow unless or until a certain threshold pressure differential is created across the seal, at which point it opens.

The pressure differential may be generated by the air flow, such as air flowing from a fan or blowers 149 (5C). This type of cover or seal is referred to as a threshold seal and several embodiments of such a seal are detailed below. Once the seal is open, it allows air to flow freely through that section 102. The cover or seal remains open as long as the air velocity flowing through the open seal is maintained at a designed level. The air stream determines the opened or closed state of the seal 150.

In such a system, when the full air flow is delivered to the array filter, all the covers or seals are open and remain open, and the air is distributed to all sections of the array. However, if the flow rate decreases for any reason, some of the seals will begin to close. When one of the seals closes, the air stream is redistributed to the remaining open sections, which means the air flow through each of the open sections will be higher than otherwise. Additional covers or seals will gradually close until the air flow rate through each of the remaining open sections is sufficient to keep it open.

The result is that as air flow changes, the filter responds dynamically and automatically—through its threshold-opened seals—to close off some of the sections while maintaining the threshold flow rate through the remaining sections, thereby maintaining the filtration efficiency required.

The threshold seals can be designed in any suitable way. An elastic cover or flap can be configured with the appropriate resilience and geometry to achieve the desired threshold. For example, an rectangular elastic flap, such as rubber or silicone or any other suitable elastic material, attached to the array on one of its edges (which serves as an axis) so that it covers an outlet or plurality of outlets, but under sufficient pressure is forced to open. Once opened, the flap remains open as long as the pressure and flow are maintained. The stiffer the flap, the higher the pressure that is required to push it open. A metal flap can be similarly configured or supported with a spring mechanism that keeps it closed unless sufficient pressure is exerted on it by the incoming air flow. In some embodiments, a gravity controlled cover can be configured for each section 102. In the case of a gravity seal, the weight of the cover keeps it lying flat on top of the outlet(s), until sufficient pressure is present to lift it on its axis. This works when the direction of air flow at the outlet is vertical (relative to gravity).

Figure 5B:
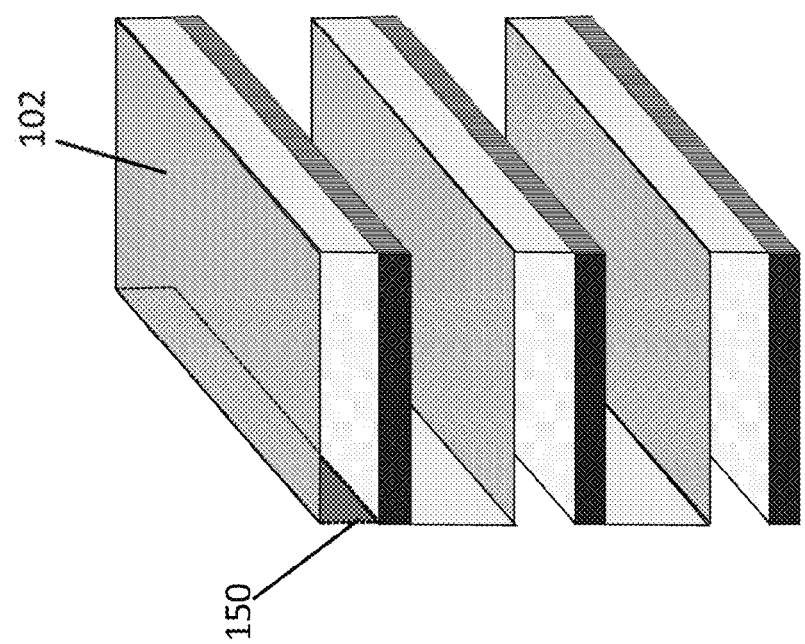
FIGS. 5A-D are schematic illustrations of a movable seal on the outlet of one of the sections of a 3-section array shown at an open seal state (5A), at a closed seal state (5B), depicting the effect of the closed seal on air flow patterns (5C), and an electromechanically controlled seal (5D), constructed and operative according to some embodiments of the present disclosure.
Figure 5A:
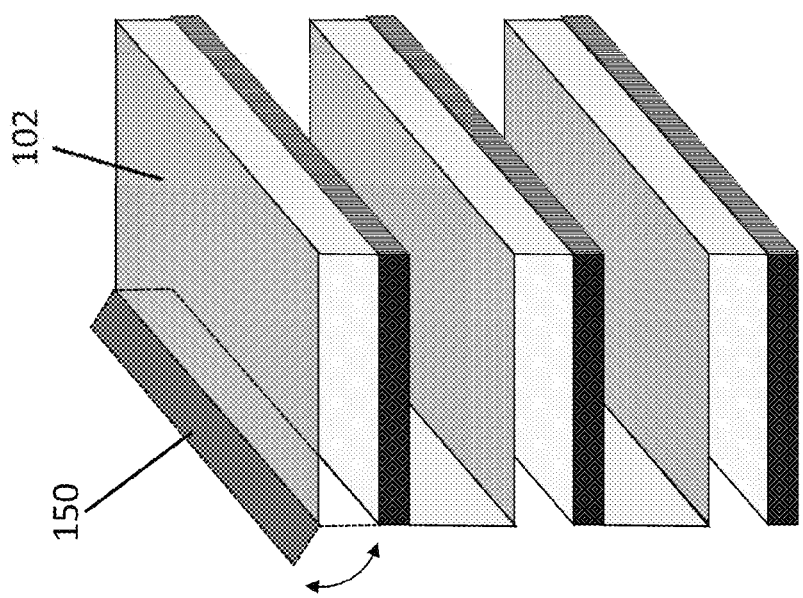
Figure 5C:
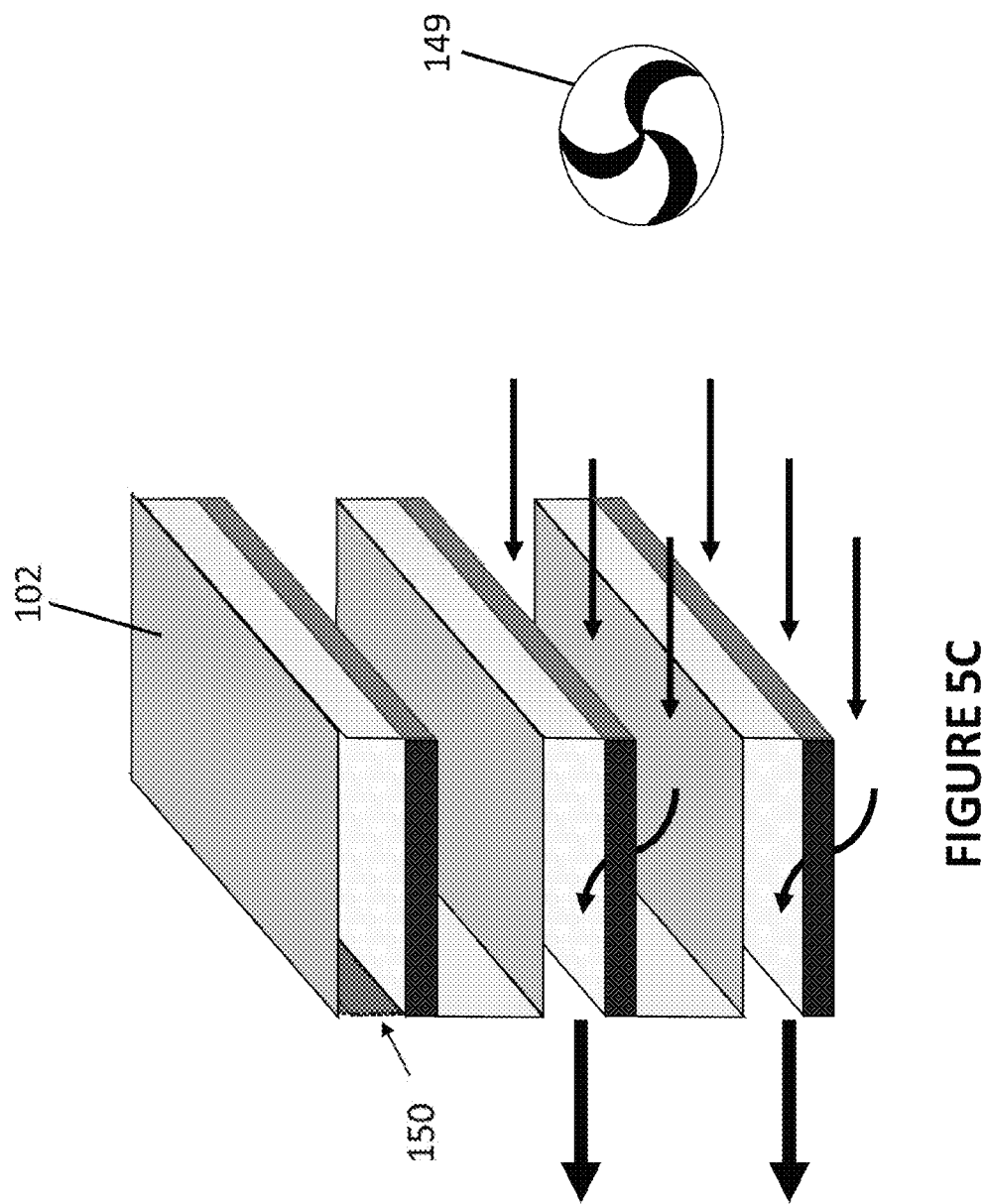
Figure 5D:
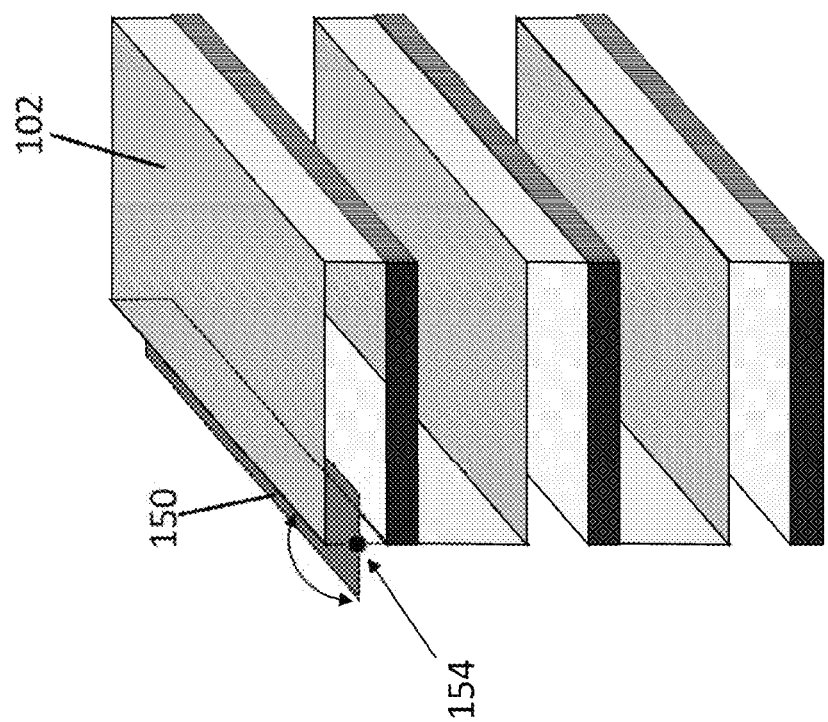

FIGS. 5A-C show a movable seal 150 on the outlet of one (e.g. the uppermost) of the sections 102 of a 3-section array. At FIG. 5A the cover or seal 150 is shown at an open state while in FIG. 5B the seal 150 is shown at a closed state. The seal is designed to open under the force of sufficient air flow or air pressure. FIG. 5C depicts the effect of the closed seal 150 on air flow patterns such that the air flow is confined to the remaining two lower, open sections 102. FIG. 5D shows a similar damper seal 150 except this seal 150 is controlled electromechanically, rotating along its central axis, and controlled by a motor or actuator 154.

Figure 6C:
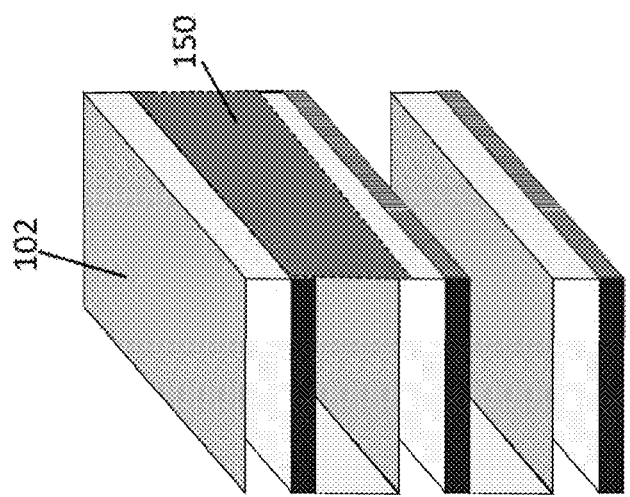
FIGS. 6A-C are schematic illustrations of cyclonic array section seals, showing all three sections comprising an outlet seal (6A), showing the two lateral cyclonic array sections comprising an outlet seal while the middle cyclonic array section does not (6B), and cyclonic array sections with an inlet seal instead of an outlet seal on one of the sections (6C), constructed and operative according to some embodiments of the present disclosure.
Figure 6B:
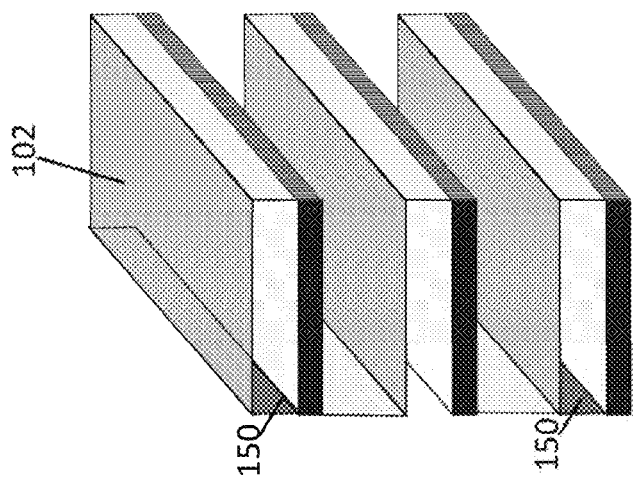
Figure 6A:
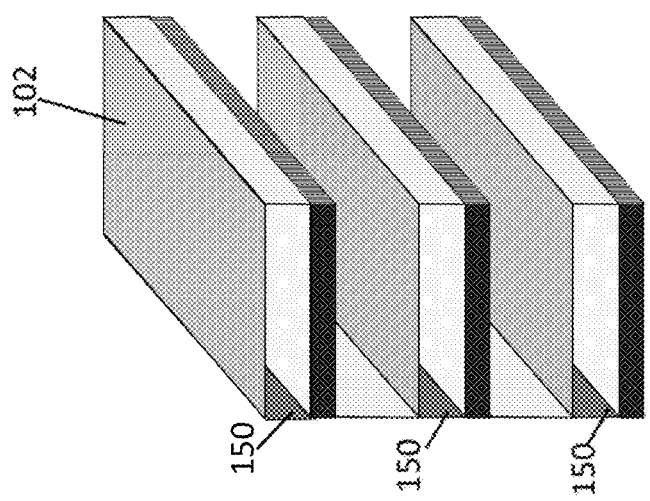

FIGS. 6A-C are schematic illustrations of cyclonic array section seals. In FIG. 6A all three sections comprise an outlet cover or seal 150. FIG. 6B shows a section subset, such as the two lateral cyclonic array sections, comprising an outlet seal 150 while the middle cyclonic array section does not. FIG. 6C shows cyclonic array sections with an inlet seal 150 instead of an outlet seal on one of the sections.

In some embodiments, the cover or seal material may comprise plastic, polymer, rubber, metal, paper and/or glass or any other suitable material, shape or form.

In some embodiments, the pressure-threshold seal 150 is implemented individually for each cyclone, and becomes an integral feature of each cyclone cell 100. This can be viewed as each cyclonic cell 100 being a "section" as described above. The cover or seal 150 can be a flexible flap or piece of material covering the outlet 126 of each cyclone cell 100 or at least some cyclone cells 100, where the elastic force tends to close the flap forming the seal 150. In other embodiments, a gravity-based element, namely one where the weight of the cover keeps it flat until sufficient air pressure forces it open, may be provided for doing the same.

In some embodiments, the cover or seal may be configured to directly cover one or more axial outlets 126 of the cells 100. In some embodiments, a single cell 100 may be provided with its own seal 150.

FIGS. 7A and 7B show an embodiment of such an outlet seal 150 configured on a single cyclonic cell 100 placed in proximity to the axial outlets of the individual cells.

FIG. 7A shows an individual cover or seal 150 on the outlet 126 of each cell 100 and FIG. 7B shows outlet seals 150 shared by a plurality, e.g. five, adjacent cells 100.

In some embodiments, each section 102 of the array is configured with a cover that is opened under sufficient air flow, volume, velocity or pressure, and closes back under its elastic force, or its weight, or any other return-force mechanism such as a spring or an elastic band, for example, when the air flow is not sufficient.

The threshold flow required to open (or close) the sectional cover or seal 150 may be, in some embodiments, an important design criterion, to ensure that the air passing through the array is adequately cleaned. The threshold is affected by the strength of the elastic or gravitational forces that tend to close the seal. In one embodiment, using a simple flap or cover, the threshold can be increased by increasing the weight or the elasticity of the cover.

In some embodiments, not all the sections have a cover or seal, and not all seals have the same threshold for remaining open. The threshold or minimum value of pressure or air flow required to open a closed seal or maintain a seal open, may have the same or different threshold values for different seals.

A subset of the sections may be configured without any sealing mechanism, thereby designated to always be open for flow, thus representing a minimum number of required sections for the range of intended applications and flow rates.

Throughout this disclosure, in some embodiments, the terms "seal" and "cover" may be used interchangeably to refer to the same feature (e.g., seal 150).

Modifying the thresholds of different sections introduces a natural hierarchy determining which sections open first or close first under changing air flow rates. The hierarchy can be further utilized by changing other features of the cells depending on which section they are in. For example, the "always open" or "first to open" sections may be configured with larger particle collection receptacles 130, as over time they are likely to capture more particles than the sections that are "last to open".

Further exemplary cyclone cells and arrays are described in Applicant's PCT publication WO2017/019628 and PCT application PCT/US18/14914, both incorporated herein in their entirety.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the ar will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure. Some embodiments may be distinguishable from the prior art for specifically lacking one or more features/elements/functionality (i.e., claims directed to such embodiments may include negative limitations).

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. An air filtration system comprising a plurality of sections configured to receive an incoming airstream, wherein:
each section comprises a first airstream receiving side (ASRS) and a second air-stream exhaust side (ASES), and a plurality of cells each comprising a cyclonic cavity having a tangential inlet arranged to receive a portion of the airstream via the ASRS, and an axial outlet arranged to exhaust the portion of the airstream to the ASES, each section is configured such that air can only cross from the ASRS to the ASES via the plurality of cells via the respective tangential inlets and axial outlets, each section is further configured with a cover that can be opened and closed, such that the closing of one or more respective covers of respective sections forces the airstream to flow through remaining sections having open covers as well as their respective cells, at a velocity greater than when such one or more respective covers are open, and a single common airstream through the system is induced by a plurality fans or blowers that provide the incoming airstream to the sections of the system.

2. The system of claim 1, wherein each cover is configured to open or close in response to surpassing at least one of a predetermined threshold of a volume, velocity, and pressure of the incoming airstream.

3. The system of claim 2, wherein the threshold for the opening or closing of at least one first cover for a first section is different than the threshold for the opening or closing for a second section.

4. The system of claim 1, wherein each cover is configured to open or close in response to falling below at least one of a predetermined threshold of a volume, velocity, and pressure of the incoming airstream.

5. The system of claim 1, wherein the cover comprises at least one of a sealing sheet or membrane, a lid, and a flap.

6. The system of claim 1, wherein each cover is configured to cover one or more axial outlets of the plurality of cells.

7. The system of claim 6, wherein one or more of the covers are configured to close due to weight and/or elastic force.

8. The system of claim 1 wherein the cover is selected from the group consisting of plastic, polymer, rubber, metal, paper, glass, or a combination of any two or more of the foregoing.

9. The system of claim 1, wherein one or more of the covers for one or more of the respective sections close in the absence of at least one of a sufficient volume, velocity, and pressure of the incoming airstream.

10. The system of claim 1, further comprising one or more motors and/or actuators configured to open and/or close the one or more covers.

11. The system of claim 10, wherein the motors and/or actuators are configured for activation by an electrical signal from a control system that directly or indirectly controls, detects, measures or received information about, airflow incident on the one or more covers configured to open and/or close via the one or motors and/or actuators.

12. The system of claim 1, further comprising one or more fans configured to generate the single common airstream.

13. The system of claim 12, wherein at least one of the volume, velocity, and pressure of the incoming airstream determines the opened or closed state of at least one cover of a respective section.

14. An air filtration system, comprising:

a plurality of sections configured to receive an incoming airstream, one or more sections of the plurality of sections configured with one or more respective covers, the one or more respective covers including at least one of a sealing sheet or membrane, a lid, and a flap and are selected from the group consisting of plastic, polymer, rubber, metal, paper, glass, or a combination of any two or more of the foregoing;

a plurality fans or blowers providing the incoming airstream to the plurality of sections of the system;

one or more motors and/or actuators configured to open and/or close the one or more respective covers, the one or more motors and/or actuators configured for activation by an electrical signal from a control system that directly or indirectly controls, detects, measures or received information about, airflow incident on the one or more respective covers; wherein:

each section comprises a first airstream receiving side (ASRS) and a second air stream exhaust side (ASES), and a plurality of cells each comprising a cyclonic cavity having a tangential inlet arranged to receive a portion of the incoming airstream via the ASRS, and an axial outlet arranged to exhaust the portion of the incoming airstream to the ASES;

each section is configured such that air can only cross from the ASRS to the ASES via the plurality of cells via the respective tangential inlets and axial outlets;

the closing of the one or more respective covers of respective sections forces the incoming airstream to flow through remaining sections having open covers and through their respective cells, at a velocity greater than when such one or more respective covers are open; and the one or more respective covers configured to open or close in response to surpassing or falling below at least one of a predetermined threshold of a volume, velocity, and pressure of the incoming airstream, the threshold for the opening or closing of at least one first cover for a first section is different than the threshold for the opening or closing for a second section.

15. An air filtration system comprising a plurality of sections configured to receive an incoming airstream, wherein:

each section of the plurality of sections comprises a first airstream receiving side (ASRS) and a second air stream exhaust side (ASES);

a first section of the plurality of sections includes a first single cell;

a second section of the plurality of sections includes a plurality of cells, the first single cell and the plurality of cells each comprising a cyclonic cavity having a tangential inlet arranged to receive a portion of the incoming airstream via the ASRS, and an axial outlet arranged to exhaust the portion of the incoming airstream to the ASES, the first section is configured such that air can only cross from the ASRS to the ASES via the first single cell via the respective tangential inlets and axial outlets; the second section is configured such that air can only cross from the ASRS to the ASES via the plurality of cells via the respective tangential inlets and axial outlets; one or more sections of the plurality of sections is configured with a cover that can be opened and closed, such that the closing of one or more respective covers of respective one or more sections forces the incoming airstream to flow through remaining sections having open covers, at a velocity greater than when such one or more respective covers are open;

and at least one section of the plurality of sections does not include a cover, wherein a single common airstream through the system is induced by a plurality fans or blowers that provide the incoming airstream to the sections of the system.

\* \* \* \* \*